United States Patent
Lowmaster

(10) Patent No.: US 7,356,023 B2
(45) Date of Patent: Apr. 8, 2008

(54) SYSTEM AND METHOD FOR FACILITATING PACKETIZED CALLS BETWEEN MANAGED NETWORKS

(75) Inventor: Robert Paul Lowmaster, Bartlett, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 62 days.

(21) Appl. No.: 10/668,616

(22) Filed: Sep. 23, 2003

(65) Prior Publication Data

US 2005/0063360 A1    Mar. 24, 2005

(51) Int. Cl.
*H04L 12/66* (2006.01)
*H04J 3/16* (2006.01)

(52) U.S. Cl. ..................... 370/352; 370/466
(58) Field of Classification Search ........ 370/352–356, 370/466
See application file for complete search history.

(56) References Cited

U.S. PATENT DOCUMENTS

| | | | | |
|---|---|---|---|---|
| 6,064,653 | A * | 5/2000 | Farris | 370/237 |
| 6,278,697 | B1 * | 8/2001 | Brody et al. | 370/310 |
| 6,597,686 | B1 * | 7/2003 | Smyk | 370/352 |
| 6,697,357 | B2 * | 2/2004 | Emerson, III | 370/352 |
| 6,754,181 | B1 * | 6/2004 | Elliott et al. | 370/252 |
| 6,798,767 | B1 * | 9/2004 | Alexander et al. | 370/352 |
| 6,815,194 | B2 * | 11/2004 | Honjo et al. | 435/227 |
| 6,829,236 | B1 * | 12/2004 | Archer | 370/353 |
| 6,870,827 | B1 * | 3/2005 | Voit et al. | 370/352 |
| 6,870,841 | B1 * | 3/2005 | Brown et al. | 370/389 |
| 2004/0180646 | A1 * | 9/2004 | Donley et al. | 455/411 |

\* cited by examiner

*Primary Examiner*—Jay K. Patel
*Assistant Examiner*—Hong Sol Cho
(74) *Attorney, Agent, or Firm*—Toler Law Group

(57) ABSTRACT

A system and method for facilitating packetized calls between managed networks are disclosed. In one embodiment of a system incorporating teachings of the present disclosure, a mediation server may be associated with and maintain an information store holding a first collection of connection information for a first plurality of devices associated with a first managed internet protocol network and a second collection of connection information for a second plurality of devices associated with a second managed internet protocol network. The devices may be capable of receiving voice over internet protocol calls and the connection information for a given device may include a unique address and a call receipt rule. In operation, the mediation server may receive a query seeking appropriate connection information for a called device associated with the first managed internet protocol network. In one embodiment, the server may collect the appropriate connection information from the first collection of connection information and initiate communication of the appropriate connection information to an address associated with the received query.

25 Claims, 2 Drawing Sheets

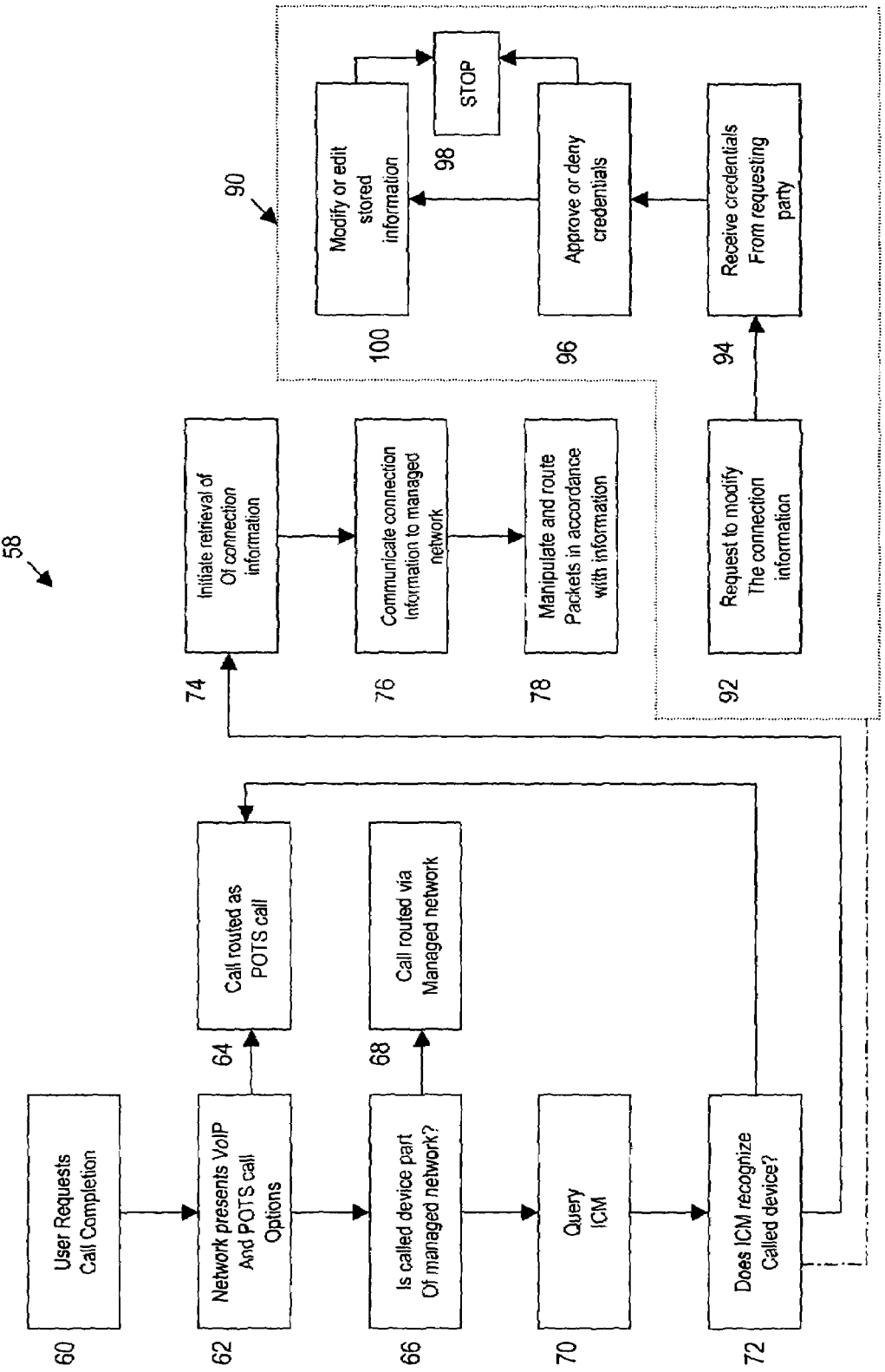

SYSTEM AND METHOD FOR FACILITATING PACKETIZED CALLS BETWEEN MANAGED NETWORKS

FIELD OF THE DISCLOSURE

The present disclosure relates to internetwork management, and more particularly to a system and method for facilitating packetized calls between managed networks.

BACKGROUND OF THE DISCLOSURE

A network is made up of a series of nodes interconnected by communication paths. Networks often interconnect with computing devices of differing types and with other networks of various sizes. An enterprise network, for example, may interconnect with several local area networks (LANs) and one or more metropolitan area networks (MANs) or wide are networks (WANs).

In practice, many large networks with broad geographic coverage, like the Internet, are made by connecting some of the nodes on one network with nodes of another network. This intermingling of network assets actually helps create the broader network. Occasionally, some of the intermingled assets are part of a managed network as opposed to the public Internet.

A given network may be characterized by several factors like who can use the network, the type of traffic the network carries, the typical nature of the network's connections, and the transmission technology the network uses. For example, one network may be public and carry circuit switched voice traffic while another may be private and carry packet switched data traffic. Whatever the make-up, most networks facilitate the communication of information between at least two nodes, and as such act as communications networks.

A difficulty may arise, however, when users on one network attempt to communicate with a user on another network. Communication across the boundaries of the two networks may create challenges. For example, while one managed network operator may be able to offer packetized voice services between users on its network, the same operator may find it more difficult to allow internetwork voice calls. Often these calls are actually carried on a circuit switched telephone network, which, in many cases, requires the calls to be translated from a packetized format like voice over internet protocol (VoIP) to a time division multiplexed (TDM) format.

BRIEF DESCRIPTION OF THE DRAWINGS

The present invention presents a technique for facilitating internetwork and intranetwork packetized calls and is pointed out with particularity in the appended claims. However, features are described in the following detailed description in conjunction with the accompanying drawings in which:

FIG. 2 depicts a simplified flow chart for a call facilitation method that incorporates teachings of the present disclosure.

DETAILED DESCRIPTION OF THE DRAWINGS

Figure 1:
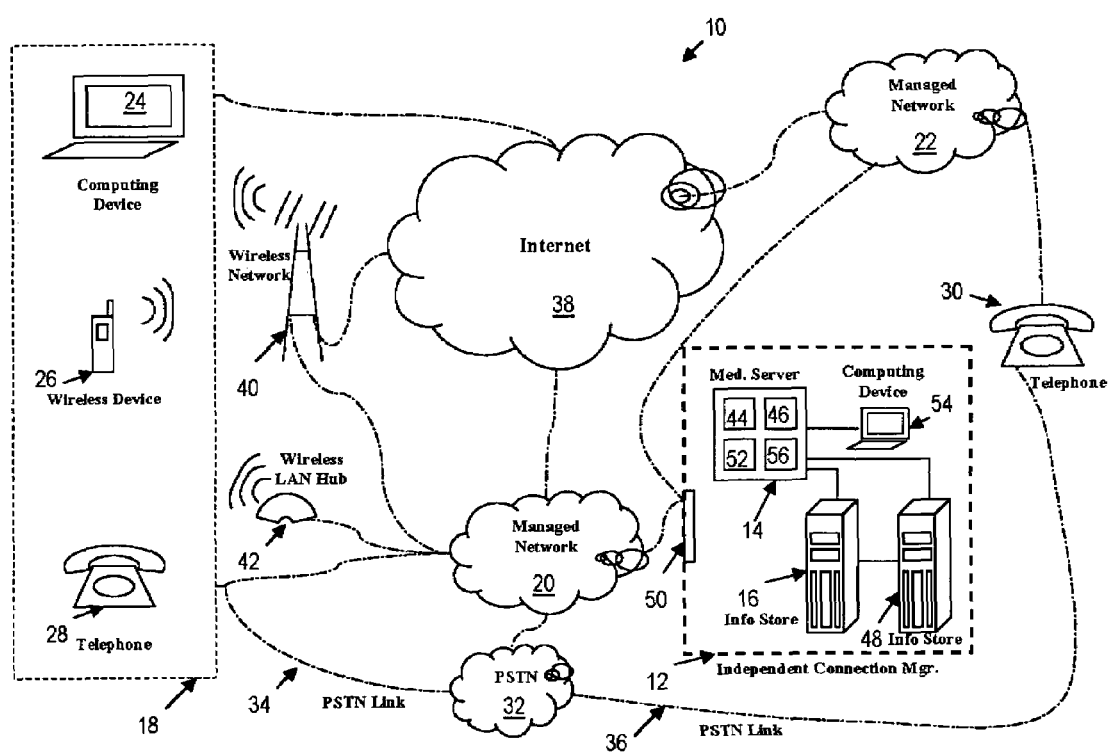
FIG. 1 shows a block diagram of a call facilitation system that incorporates teachings of the present disclosure.

Vendors and carriers may begin to deploy or provide a packetized voice over internet protocol (VoIP) service on managed internet protocol (IP) networks. These managed networks may appear as communication islands and may permit IP data calls and VoIP calls to be delivered between electronic devices that may reside on or be associated with a particular managed network. To make an internetwork call, a user may need to know a great deal of information about the called device and the network associated with the called device.

Even if a calling party knows the connection information for the called device, the actual call and its quality may be adversely affected by some call manipulation occurring during the call. For example, a VoIP call may be converted into a time division multiplexing (TDM) format at the interface of the calling party's managed network and the public switched telephone network (PSTN). The TDM formatted call may be delivered to the called party's managed network via the PSTN, where it may be converted back into a VoIP format. This dual conversion process may be inefficient and may cause call quality degradation.

The present disclosure presents a system and method for facilitating packetized calls between managed networks. As mentioned above in the brief description of the drawings, FIG. 1 shows a block diagram of a call facilitation system 10 that incorporates teachings of the present disclosure. System 10 includes an independent connection manager (ICM 12) operating in a service bureau mode. As depicted, ICM 12 may be logically separated from the various networks it supports. In practice, ICM 12 may be physically located within one of the supported networks while maintaining a logical separation from the networks.

In the embodiment of FIG. 1, ICM 12 may include several different components performing functions that facilitate voice over internet protocol (VoIP) calls between disparate managed networks. The various components of ICM 12 may be implemented in forms that include hardware, software, firmware, combinations thereof, or other.

In the depicted embodiment, ICM 12 may include a mediation server 14, which may be communicatively coupled with and maintaining an information store 16. Information store 16 may be holding connection information for a collection of devices 18 associated with a managed internet protocol network 20 and additional connection information for other devices like telephone 30 associated with a different managed internet protocol network 22. Devices included in collection 18 may include computers like laptop 24, wireless telephones like cell phone 26, wireline telephones like telephone 28, or some other electronic device capable of receiving voice over internet protocol calls.

With voice calls and or data calls, the network and device types may affect how call information is communicated. Similarly, the connection or link type may impact delivery of call-related information. For example, a user may make a call from telephone 28 to telephone 30 across Public Switched Telephone Network 32. PSTN 32 may be made up of competitive local exchange carriers (CLECs), incumbent local exchange carriers (ILECs), which may be regional Bell operating companies (RBOCs), an interexchange carrier (IXC), or combinations thereof. In some cases, the entire call may be a plain old telephony service (POTS) call. As such, link 34 may communicatively connect telephone 28 to PSTN 32 across a twisted pair connection and some appropriate backhaul to a central office. Similarly, link 36 may communicatively connect telephone 30 to PSTN 32 across a twisted pair connection and some appropriate backhaul to a central office.

In some circumstances, a user may want to make a VoIP call from telephone 28 to telephone 30. During such a call, telephone 28 may send a signal representing the VoIP call to managed network 20. Managed network 20 may recognize that telephone 28 is attempting to call telephone 30. Managed network 20 may determine that telephone 30 is not connected to managed network 20 and may "ask" ICM 12 how to connect to telephone 30. Mediation server 14 of ICM 12 may determine that telephone 30 is associated with managed network 22. Mediation server 14 may direct the retrieval of appropriate connection information from an information store like information store 16 and communicate the connection information back to managed network 20.

Managed network 20 may then manipulate and route the packets of telephone 28's VoIP call in accordance with the connection information received from ICM 12. In some cases, managed network 20 may decide against continuing with the routing of the call as an IP routed call. Managed network 20 may instead route the call through a Media Gateway to PSTN 32. This may occur, for example, when managed network 20 determines that it cannot conform the call to the specifications received from ICM 12.

In one IP completed embodiment, the VoIP call may be routed through public Internet 38 to managed network 22 and onto telephone 30, effectively using public Internet 38 as the path for interconnecting the two managed IP networks. In another embodiment, a peering arrangement between the two managed IP networks may be established, allowing for direct or near-direct handoff between the managed networks 20 and 22. In preferred embodiments, ICM 12 may provide appropriate connection information to various managed networks and avoid being a point of interconnection for call signaling and/or bearer traffic.

As mentioned above, at least a portion of the call may be made across a network like public Internet 38. The call connection may involve the communication of a TCP/IP packet or some other packet or frame and may be pure data communication, pure voice communication, or a combination data and voice communication. The voice portion of a combined call may involve the creation of a derived voice channel, a VoIP call, an instant messenger (IM) connection, some other technique, or a combination thereof.

As depicted in FIG. 1, a user may initiate and/or receive a call with cell phone 26. Using cell phone 26 may involve communicating via a wireless network component 40, a portion of managed network 20, PSTN 32, public Internet 38, and/or combinations thereof. A wireless link type may depend on the electronic components associated with a given wireless access device and other wireless networking components like cellular towers or wireless local area network (LAN) hubs, like 802.11 hub 42.

The wireless access device, cellular tower and/or wireless hub (Wireless Enabled Devices) may include any of several different components. For example, a Wireless Enabled Device may have a wireless wide area transceiver, which may be part of a multi-device platform for communicating data using radio frequency (RF) technology across a large geographic area. This platform may be a GPRS, EDGE, or 3GSM platform, for example, and may include multiple integrated circuit (IC) devices or a single IC device.

A Wireless Enabled Device may also have a wireless local area transceiver, which may communicate using spread-spectrum radio waves in a 2.4 GHz range, 5 GHz range, or other suitable range. The wireless local area transceiver may be part of a multi-device or single device platform and may facilitate communication of data using low-power RF technology across a small geographic area. For example, if the wireless local area transceiver includes a Bluetooth transceiver, the transceiver may have a communication range with an approximate radius of one hundred feet. If the wireless local area transceiver includes an 802.11(x) transceiver, such as an 802.11(a)(b) or (g), the transceiver may have a communication range with an approximate radius of one thousand feet.

As mentioned above, whatever the device and/or network type, the connection information for a given device and/or network may include a unique address and a call receipt rule. The unique address may take the form of a Media Access Control (MAC) address and/or an IP address, like an IPv6 address, or some other unique identifier. In some embodiments, a MAC address may identify a unique hardware number associated with a given electronic device. In some embodiments, a mapping engine like mapping engine 44 may maintain a correspondence table capable of relating an IP address to a MAC address. Preferably, a MAC address could be used by the Media Access Control sublayer of the Data-Link Layer (DLC) to help identify a physical device type, as there may be a different MAC sublayer for each physical device type.

Whatever the format of the unique address, a system like system 10 may employ static addresses, dynamic addresses, or combinations thereof. In addition, the uniqueness of an address may describe true uniqueness—in that a given device is the only device with that address or effective uniqueness. An effectively unique address may not be truly unique but may provide sufficient uniqueness to identify a given device.

As mentioned above, connection information may also include at least one receipt rule. A receipt rule may provide information relevant to the capabilities and preferences of a given device and/or network. For example, a receipt rule may include an IP header rule defining, for example, appropriate header sizes. A receipt rule may include a real time transport protocol/real time control protocol (RTP/RTCP) rule defining, for example, how a device constructs and/or reconstructs data and how codec bit streams are packetized. A receipt rule may include an allowable sample size rule defining, for example, appropriate sizes as 10, 20, or 30 milliseconds. A receipt rule may include a network access rule defining, for example, that a called network should be accessed via the public Internet and what addresses should be used for specific telephone numbers found on the mediation server. For example, in some embodiments, mapping engine 44 may maintain a table that links dialed telephone numbers to a unique address of a VoIP-capable device. A receipt rule may also include a supported coding protocol rule defining, for example, that the called network supports a G.711 or other protocol.

In operation, mediation server 14 may receive a query from managed network 22 seeking appropriate connection information for a called device associated with managed network 20. In one embodiment, mediation server 14 may collect the appropriate connection information from information store 16 and initiate communication of the appropriate connection information with communication engine 46 to an address associated with the received query. For example, the query may have a header that includes an indication of who or what device is making the request. Communication engine 46 may consider the information contained in the header when determining where to send the appropriate connection information.

In some embodiments, mediation server 14 may have a zoned information store including a first collection of connection information for a first plurality of callable devices associated with managed network 20 and a second collection of connection information for a second plurality of callable devices associated with managed network 22. As depicted in FIG. 1, the first collection may be located in information store 16 and the second collection may be located in information store 48. Though depicted as separate hardware components, zoning may be accomplished in software as well.

By zoning the information store, ICM 12 may allow a managed network or its administrator to access and modify the connection information maintained in the information store. For example, an administrator of managed network 20 may need to modify the connection information maintained in information store 16 for telephone 28. To allow for such modifications, ICM 12 may include a network interface engine like interface engine 50. Interface engine 50 may be communicatively coupled to mediation server 14 and may be capable of receiving a query seeking appropriate connection information or modifying connection information for a given device. In preferred embodiments, interface engine 50 may be designed such that it does not act as a point of interconnection for either signaling or bearer traffic between managed network 20 and managed network 22.

In light of the potential authority granted to a remotely located administrator, a system incorporating teachings of the present disclosure may elect to use some rights management technique. For example, a system like system 10 may employ a security engine 52, which may be made up of an authentication engine and an authorization engine. In practice, the authentication engine may be communicatively coupled to interface engine 50. The authentication engine may be able to compare an initial set of credentials received from the calling party against a maintained set of credentials. The credentials may include, for example, a user name and password combination. If the received credentials match the maintained credentials, the authorization engine may grant access to information store 16. In preferred embodiments, security engine 52 may recognize that the authorized administrator is administering managed network 20 and, as such, only grant the administrator access to information store 16—holding back from the administrator edit rights to the information in information store 48. Altering information in ICM 12 may also be accomplished locally. For example, ICM 12 may include a management console 54 from which a local administrator may manage ICM 12, mediation server 14, information stores 16 and 48, and/or all of these components.

In operation, mediation server 14 may also include a find and retrieval engine (FRE) 56. FRE 56 may be communicatively coupled to interface engine 50 and capable of determining if a called device is associated with managed network 20 or managed network 22. Making such a determination may "tell" FRE 56 which zone of the information store holds the appropriate connection information. In practice, FRE 56 may be associated with mediation server 14 and may be capable of directing collection of the appropriate connection information from information store 16.

Operation of a system like system 10 may be better understood in connection with a description of FIG. 2. As mentioned above, FIG. 2 depicts a simplified flow chart for a call facilitation method that incorporates teachings of the present disclosure. Routine 58 of FIG. 2 may start at step 60, at which point a managed network may receive a signal indicating a request for a call to a party associated with a telephone like telephone 30 of FIG. 1. The call may be deliverable as a voice over internet protocol call. As such, at step 62, the managed network may present the calling party with call options including call completion as a VoIP call or a POTS call. If the user selects POTS call completion, routine 58 may progress to step 64 and the call may be routed as a POTS call. If the call came in as a VoIP call, step 64 may involve sending the call to a media gateway, where the call may be converted to a TDM call.

If the user selects VoIP call completion, routine 58 may progress to step 66, where the managed network receiving the initial call request may determine whether or not the called device is part of its managed network. If the called device is on the same managed network as the calling device, routine 58 may progress to step 68 where the call is completed across the one managed network.

If the called device is not on the same managed network as the calling device, routine 58 may progress to step 70 where a query is sent to an information store maintained at an ICM like ICM 12 of FIG. 1. The query may effectively "ask" the ICM if the ICM "knows" how to connect to the called device. The called device may be identified by a telephone number or some other identifier, and the original managed network may need to have that telephone number converted into a unique IP and/or MAC address. The original managed network may also need to know what receipt rules, if any, exist for the called device and/or network associated with the called device.

At step 72, the ICM may determine whether it "knows" and/or can "find" an entry for the called device. In some embodiments, an ICM may zone its information stores to isolate the connection information of one managed network from the connection information of another managed network. In such an embodiment, step 72 may include determining which collection of connection information includes the appropriate connection information for the called device.

If the ICM cannot find the called device at 72, this condition may be reported back to the original managed network and routine 58 may progress to step 64 where the call is routed at least partially as a POTS call. If the ICM can find the called device, routine 58 may progress to step 74 where the ICM initiates retrieval of appropriate connection information for the called device. At step 76, the ICM may initiate communication of the appropriate connection information to the original managed network.

At step 78, the original managed network may manipulate and route packets of the VoIP call in accordance with the connection information received from the ICM. In one embodiment, the VoIP call may be routed through the public Internet to a different managed network and onto the called device. In preferred embodiments, the ICM may provide appropriate connection information to various managed networks and avoid being a point of interconnection for call signaling and/or bearer traffic.

As mentioned above, if the ICM cannot find the called device at step 72, this condition may be reported back to the original managed network and routine 58 may progress to step 64 where the call is routed at least partially as a POTS call. The not known determination may also indicate the need for a modification routine 90. At step 92 of modification routine 90, the ICM may receive a request to modify a collection of connection information. At step 94, the ICM may request and receive credentials from a party or administrator making the request. At step 96, the credentials may be compared against a maintained list of credentials and the party may be allowed editing access to an information store holding the to-be-changed connection information. If the credentials are not accepted, modification routine 90 may progress to step 98, where the routine stops.

If the credentials are accepted, modification routine may progress to step 100 where the party is granted editing access to an information store or a specific zone of the information store and the party modifies the appropriate connection information. In some embodiments, the information stores may be zoned such that allowing the party access to a first collection of connection information does not automatically allow the party access to all of the connection information maintained at the ICM. The party may then exit from the ICM system and modification routine 90 may progress to a stop at step 98.

The various managed networks may use the connection information provided by an ICM in several different ways. The information may simply be used to format and route information packets to their intended destination. In some embodiments, a system incorporating teachings of the present disclosure may be able to adapt information exchange to a given device, to a user preference, and/or network state or other condition. A managed network may include a format converter that can translate in accordance with the appropriate connection information at least a portion of a VoIP or data call into a signal and/or signal type receivable by a called device on a different managed network. There may be several mark-up languages and techniques employed in a system like system 10 to facilitate this and other capabilities. For example, a designer of system 10 may elect to use XHTML, SMIL or some other mark-up language in conjunction with a speech recognition engine. Other designers may elect to use VoiceXML, HTML, Voice Browser, Xforms, and/or others.

In preferred embodiments, a format converter, which may be a stand alone engine or an asset incorporated into another engine, may be capable of translating at least a portion of a first signal representing a call into a second signal that also represents the call, the second signal receivable by the called device and network.

In practice, the information communicated across the various links of FIG. 1 may be compressed and/or encrypted prior to communication. At least a portion of the communication may be via a circuit-switched network like most wireline telephony networks, a frame-based network like Fibre Channel, or a packet-switched network that may communicate using TCP/IP packets like public Internet 38 of FIG. 1. The physical medium making up at least a portion of the links may be coaxial cable, fiber, twisted pair, an air interface, other, or combination thereof. In some embodiments, at least one of the links may be a broadband connection facilitated by an xDSL modem, a cable modem, an 802.11x device, some other broadband wireless linking device, or combination thereof.

In some embodiments, various pieces of information in addition to or in lieu of voice call information may be communication in a format that facilitates display on a graphical user interface. The information may be sent as a file for download and play, as streaming content, as some other format, or some combination thereof. The information may include audio information, textual information, video information, some other type of information, or a combination thereof. As such, in some systems incorporating teachings of the present disclosure, an information store may include connection information that includes, among other things, information describing display capabilities and additional address information for different devices capable of receiving additional information.

If, for example, a called party is hearing impaired and employs a piece of customer premises equipment (CPE) capable of presenting a transcript of the verbal communication occurring, an information store may maintain connection information indicating the existence of that piece of CPE. In other embodiments, a piece of CPE may support packetized or POTS voice traffic while also supporting data traffic. The system may inform a calling party of this capability and facilitate the called party's receipt of audible information as voice traffic and graphical information as data traffic. As such, a system incorporating teachings of the present disclosure may "know" to convert a telephony portion of a call to audible information and a data portion of the call to graphical information.

Many of the above techniques may be provided by a computing device executing one or more software applications or engines. The software may be executing on a single computing platform or more than one. The platforms may be highly capable workstations, personal computers, microprocessors, servers, or other devices capable of performing the techniques. The platforms may execute commands maintained in a computer-readable medium. In one embodiment of an ICM, platform or collection of platforms may be executing commands described in computer-readable data to maintain an information store comprising a first collection of connection information for a first plurality of devices associated with a first managed internet protocol network and a second collection of connection information for a second plurality of devices associated with a second managed internet protocol network, to receive a query seeking appropriate connection information for a called device associated with the first managed internet protocol network; to collect the appropriate connection information from the first collection of connection information, and to initiate communication of the appropriate connection information to an address associated with the query.

It will be apparent to those skilled in the art that the disclosed embodiments may be modified in numerous ways and may assume many embodiments other than the particular forms specifically set out and described herein. For example, embodiments may be employed with voice networks, data networks, other communications networks, or combinations thereof.

Accordingly, the above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of facilitating calls, the method comprising:
storing, at a mediation server, first connection information and second connection information, the first connection information including a unique address for each of a first plurality of devices associated with a first managed Internet Protocol (IP) network and a first set of call receipt rules relating to calls placed to the first plurality of devices, and the second connection information including a unique address for each of a second plurality of devices associated with a second managed P network and a second set of call receipt rules relating to calls placed to the second plurality of devices;

receiving a query at the mediation server from a device associated with the second managed IP network, the query relating to a device associated with the first managed IP network; and sending, in response to the query, the first connection information related to the device associated with the erst managed IP network from the mediation server to the device associated with the second managed IP network;

wherein the first set of call receipt rules relates to a first format of IP data that is acceptable to the first plurality of devices; and wherein the second set of call receipt rules relates to a second format of IP data that is acceptable to the second plurality of devices.

2. The method, as recited in claim 1, wherein the mediation server does not provide call signaling information or call data to the first plurality of devices, the second plurality of devices, or any combination thereof.

3. The method, as recited in claim 1, further comprising:
receiving a request to modify the first connection information at the mediation server from a particular device associated with the first managed IP network;
receiving credentials at the mediation server from the particular device associated with the first managed IP network; and
modifying the first connection information according to commands received at the mediation server from the particular device associated with the first managed IP network.

4. The method, as recited in claim 3, wherein the credentials received at the mediation server from the particular device associated with the first managed IP network allow access to modify the first connection information, but do not allow access to modify the second connection information.

5. The method, as recited in claim 1, wherein the first connection information is stored at a first information store associated with the mediation server and the second connection information is stored at a second information store associated with the mediation server.

6. The method, as recited in claim 1, wherein the first call receipt rules include an Internet Protocol (IP) header rule, an allowable sample size ratio, a network access rule, a real time transport protocol/real time control protocol (RTP/RTCP) rule, or any combination thereof.

7. A method of facilitating calls, the method comprising:
receiving, at a device associated with a first managed Internet Protocol (IP) network, a request to place a call to a device associated with a second managed IP network;
sending a query to an information store from the device associated with the first managed IP network to identity connection information relating to the device associated with the second managed IP network, wherein the connection information includes a set of call receipt rules tat relates to a format of IP data that is acceptable to the device associated with the second managed IP network;
receiving the requested connection information at the device associated with the first managed IP network from the information store;
converting, at the device associated with the first managed IP network, IP data associated with the call to the format of IP data that is acceptable to the device associated with the second managed IP network; and
routing the converted call IP data to the device associated with the second managed IP network from the device associated with the first managed IP network.

8. The method, as recited in claim 7, wherein the device associated with the first managed IP network provides a calling party associated with the first managed IP network with an option to complete the call as a voice over Internet Protocol (VoIP) call or as a circuit switched call.

9. The method, as recited in claim 7, further comprising:
routing the call to a media gateway accessible to a public switched telephone network (PSTN) in response to receiving a selection from the calling party indicating the option to place the call as a circuit switched call; and
converting the IP data associated with the call at the device associated with the first managed IP network in response to receiving a selection indicating the option to place the call as a VoIP call.

10. A system to facilitate calls, the system comprising:
an information store to store first connection information and second connection information, the first connection information including a unique address for each of a first plurality of devices associated with a first managed Internet Protocol (IP) network and a first set of call receipt rules relating to calls placed to the first plurality of devices, and the second connection information including a unique address for each of a second plurality of devices associated with a second managed IP network and a second set of call receipt rules relating to calls placed to the second plurality of devices; and
a processor and a memory that is accessible to the processor, the memory including:
a network interface engine executable by the memory to receive a query from a device associated with the second managed IP network, the query relating to a device associated with the first managed IP network; and
a communication engine executable by the processor to send, in response to the query, the first connection information related to the device associated with the first managed IP network to the device associated with the second managed IP network;
wherein the first set of call receipt rules relates to a first format of IP data that is acceptable to the first plurality of devices; and
wherein the second set of call receipt rules relates to a second format of IP data that is acceptable to the second plurality of devices.

11. The system, as recited in claim 10, wherein the network interface engine communicates with the first managed IP network via a first private network and communicates with the second managed IP network via a second private network.

12. The system, as recited in claim 10, wherein the memory includes a find and retrieval engine executable by the processor to identify and retrieve the first connection information from the information store.

13. The system, as recited in claim 10, wherein the first connection information is stored in a first area of the information store and the second connection information is stored in a second area of the information store.

14. The system, as recited in claim 10, wherein the memory includes a mapping engine executable by the processor to link the unique IP addresses associated with telephony devices of the first managed IP network and the unique IP addresses associated with telephony devices of the second managed IP network with respective telephone numbers.

15. The system, as recited in claim 10, wherein the memory includes an authentication engine executable by the processor to compare a set of credentials received from a particular device associated with the first managed IP network with a maintained set of credentials stored at the information store.

16. The system, as recited in claim 15, wherein the memory includes an authorization engine executable by the processor to grant access to the information store if the received set of credentials matches the maintained set of credentials.

17. The system, as recited in claim 16, wherein the access to the information store includes editing the first connection information.

18. The system, as recited in claim 15, wherein the authentication engine is executable by the processor to compare a set of credentials received from a management console coupled to the information store having the maintained set of credentials.

19. A system to facilitate calls, the system comprising:
a first managed Internet Protocol (IP) network device including a processor and a memory accessible to the processor, the memory including:
 a call request engine executable by the processor to receive a request to place a call to a device associated with a second managed IP network;
 a connection information engine executable by the processor to send a query to an information store to identify connection information relating to the device associated with the second managed IP network, wherein the connection information includes a set of call receipt rules that relates to a format of IP data that is acceptable to the device associated with the second managed IP network;
 a data conversion engine executable by the processor to convert IP data associated with the call to the format of IP data acceptable to the device associated with the second managed IP network after receiving the requested connection information; and
 a routing engine executable by the processor to route the converted call IP data to the device associated with the second managed IP network.

20. The system, as recited in claim 19, wherein the connection information engine is executable by the processor to:
 send a query to the information store to identify connection information related to a device associated with a third managed IP network; and
 receive an indication from the information server that the connection information relating to the device associated with the third managed IP network is not available at the information store.

21. The system, as recited in claim 20, wherein the routing engine is executable by the processor to route IP data associated with a call to the device associated with the third managed IP network via a media gateway accessible to a circuit switched network.

22. The system, as recited in claim 20, wherein the call request engine receives the call request from a telephony device.

23. The system, as recited in claim 22, wherein the telephony device is a wireline telephone, a wireless telephone, a personal computer, or any combination thereof.

24. The system, as recited in claim 20, wherein the device associated with the second managed IP network is a telephony device.

25. A computer-readable medium having instruction to cause a processor to execute a method comprising:
 storing, at a mediation server, first connection information and second connection information, the first connection information including a unique address for each of a first plurality of devices associated with a first managed Internet Protocol (IP) network and a first set of can receipt rules relating to calls placed to the first plurality of devices, and the second connection information including a unique address for each of a second plurality of devices associated with a second managed IP network and a second set of call receipt rules relating to calls placed to the second plurality of devices;
 receiving a query at the mediation sewer from a device associated with the second managed IP network, the query relating to a device associated with the first managed IP network; and
 sending, in response to the query, the first connection information related to the device associated with the first managed IP network from the mediation server to the device associated with the second managed IP network;
 wherein the first set of call receipt rules relates to a first format of IP data that is acceptable to the first plurality of devices; and
 wherein the second set of call receipt rules relates to a second format of IP data that is acceptable to the second plurality of devices.

* * * * *